US006947483B2

(12) United States Patent
Engwer (10) Patent No.: US 6,947,483 B2
(45) Date of Patent: Sep. 20, 2005

(54) METHOD, APPARATUS, AND SYSTEM FOR MANAGING DATA COMPRESSION IN A WIRELESS NETWORK

(75) Inventor: Darwin A. Engwer, Pleasanton, CA (US)

(73) Assignee: Nortel Networks Limited, St. Laurent (CA)

( * ) Notice: Subject to any disclaimer, the term of this patent is extended or adjusted under 35 U.S.C. 154(b) by 779 days.

(21) Appl. No.: 09/751,293

(22) Filed: Dec. 28, 2000

(65) Prior Publication Data

US 2002/0085631 A1 Jul. 4, 2002

Related U.S. Application Data

(60) Provisional application No. 60/226,402, filed on Aug. 18, 2000.

(51) Int. Cl.$^7$ ................................................. H04B 1/66
(52) U.S. Cl. .................. 375/240; 375/240.03; 370/249; 370/252; 370/312; 370/331; 455/437; 455/434; 455/69; 709/227; 709/204; 709/246; 704/270; 382/238; 358/1.16
(58) Field of Search ................................. 375/225, 240, 375/240.03; 709/227, 204, 246; 704/270; 370/249, 312, 331, 252; 455/437, 434, 69; 382/238

(56) References Cited

U.S. PATENT DOCUMENTS

| 5,440,545 A | | 8/1995 | Buchholz | |
| 5,450,616 A | * | 9/1995 | Rom | 455/69 |
| 5,454,026 A | * | 9/1995 | Tanaka | 455/437 |

(Continued)

FOREIGN PATENT DOCUMENTS

EP    0 862 143 A2   9/1998

OTHER PUBLICATIONS

J. Zweig, C. Puig; A Distributed Medium Access Protocol for Wireless LANs; IEEE Transcations on Communications; 1995; pp. 238–242.*

Chi–Chun Lo, et al. "QoS provisioning in handoff algorithms for wireless LAN", International Zurich Seminar on Broadband Communications. Accessing, Transmission, Networking, Feb. 17, 1998, pp. 9–16, XP002151137.

(Continued)

Primary Examiner—Stephen Chin
Assistant Examiner—Sudhanshu C. Pathak
(74) Attorney, Agent, or Firm—Blakely Sokoloff Taylor & Zafman (57) ABSTRACT

According to one aspect of the present invention, a method is provided in which an access point and a mobile unit associated with the access point may optionally transmit compressed data to each other if the receiving unit is capable of handling data compression. In one embodiment, the access point communicates to one or more mobile units to inform the one or more mobile units of the access point's compression capabilities. A mobile unit which is associated with the access point, upon being informed that the access point is capable of handling data compression, may optionally compress data prior to transmitting the data to the access point. The access point, upon receiving compressed data from the mobile unit which indicates to the access point that the mobile unit is capable of handling data compression, may optionally compress data prior to transmitting the data to the mobile unit. In one embodiment, the access point considers various factors to decide whether to compress data prior to transmitting the data to the mobile unit. In one embodiment, the mobile unit also considers various factors to decide whether to compress data prior to transmitting the data to the access point.

37 Claims, 5 Drawing Sheets

U.S. PATENT DOCUMENTS

| | | | |
|---|---|---|---|
| 5,481,535 A | | 1/1996 | Hershey |
| 5,483,676 A | | 1/1996 | Mahany |
| 5,490,139 A | * | 2/1996 | Baker et al. ................. 370/312 |
| 5,548,821 A | | 8/1996 | Coveley |
| 5,621,894 A | * | 4/1997 | Menezes et al. ............ 709/227 |
| 5,710,885 A | | 1/1998 | Bondi |
| 5,838,770 A | | 11/1998 | Fukushima et al. |
| 5,881,104 A | * | 3/1999 | Akahane ..................... 375/240 |
| 5,889,772 A | | 3/1999 | Fischer et al. |
| 5,901,362 A | | 5/1999 | Cheung et al. |
| 5,953,426 A | | 9/1999 | Windel et al. |
| 5,958,018 A | * | 9/1999 | Eng et al. ................... 709/246 |
| 5,987,011 A | | 11/1999 | Toh |
| 5,987,062 A | | 11/1999 | Engwer et al. |
| 5,991,287 A | | 11/1999 | Diepstraten |
| 6,058,106 A | | 5/2000 | Cudak et al. |
| 6,067,297 A | | 5/2000 | Beach |
| 6,072,836 A | * | 6/2000 | Hardiman .............. 375/240.03 |
| 6,115,390 A | | 9/2000 | Chuah |
| 6,115,610 A | | 9/2000 | Goetz |
| 6,173,411 B1 | | 1/2001 | Hirst |
| 6,175,856 B1 | * | 1/2001 | Riddle ........................ 709/204 |
| 6,178,327 B1 | | 1/2001 | Gomez |
| 6,182,043 B1 | * | 1/2001 | Boldl ......................... 704/270 |
| 6,192,230 B1 | | 2/2001 | van Bokhorst et al. |
| 6,330,231 B1 | * | 12/2001 | Bi .............................. 370/328 |
| 6,331,983 B1 | | 12/2001 | Haggerty et al. |
| 6,418,130 B1 | * | 7/2002 | Cheng et al. ................ 370/331 |
| 6,438,108 B1 | * | 8/2002 | Kanljung et al. ........... 370/249 |
| 6,456,597 B1 | | 9/2002 | Bare |
| 6,456,860 B1 | | 9/2002 | Nakagaki |
| 6,535,493 B1 | | 3/2003 | Lee et al. |
| 6,538,764 B2 | * | 3/2003 | Ueda ......................... 358/1.16 |
| 6,577,609 B2 | | 6/2003 | Sharony |
| 6,580,700 B1 | | 6/2003 | Pinard et al. |
| 6,614,937 B1 | * | 9/2003 | Hwang ....................... 382/238 |
| 6,657,954 B1 | | 12/2003 | Bird |
| 6,690,659 B1 | | 2/2004 | Ahmed |
| 6,697,336 B1 | * | 2/2004 | Socher ....................... 370/252 |
| 6,697,378 B1 | | 2/2004 | Patel |
| 6,701,631 B1 | | 3/2004 | Monteiro et al. |
| 6,714,514 B1 | | 3/2004 | Espax et al. |
| 2001/0041568 A1 | * | 11/2001 | Hughes et al. .............. 455/434 |
| 2001/0048744 A1 | | 12/2001 | Skimura |
| 2002/0009199 A1 | | 1/2002 | Ala-Laurila et al. |

OTHER PUBLICATIONS

"IEEE standard for information technology–telecommunications and information exchange between systems–local and metropolitan area networks–specific requirement. Part II: wireless LAN medium access control (MAC) and physical layer (PHY) specification. (ISO/IEC 8802–11, ANSI/IEEE Std 802.11–1999)" Aug. 20, 1999, pp. 38–54, XP002206839.

Koutroubinas, et al., "A New Efficient Access Protocol for Integrating Multimedia Service in the Home Environment", Aug. 1999, IEEE, IEEE Transactions on Consumer Electronics, vol. 45, Issue 3, pp. 481–487.

* cited by examiner

METHOD, APPARATUS, AND SYSTEM FOR MANAGING DATA COMPRESSION IN A WIRELESS NETWORK

RELATED APPLICATIONS

This application claims benefit of U.S. Provisional Application No. 60/226,402, filed Aug. 18, 2000.

FIELD OF THE INVENTION

The present invention relates generally to the field of networking. In particular, this invention relates to a method, apparatus, and system for doing data compression in a wireless network.

BACKGROUND OF THE INVENTION

The ability of users to access programs and share data over local area networks (referred to as "LANs") has become a necessity for most working environments. To improve efficiency and ease of use, certain enhancements may be added to a LAN such as remote wireless access. By providing remote wireless access, a wireless LAN (WLAN) is formed.

As described in U.S. Pat. No. 5,987,062 issued to Netwave Technologies, Inc., now owned by Nortel Networks Limited, one type of WLAN employs dedicated stations, which are referred to as access points (APs). Therein, each AP is a relay station that receives data packets from a mobile unit (MU) such as a notebook-type computer with a suitable adapter card as described in U.S. Pat. No. 5,987,062. Thereafter, the AP transmits the data packets received from the mobile unit to the fixed backbone network. Of course, the AP also receives data packets from the fixed backbone network for transmission to one or more mobile units.

Before data transmission can occur between the fixed backbone network and an MU via an AP, the AP must first authenticate the respective MU. The authentication is accomplished by the MU transmitting a request for authentication message to the AP, and the AP sending back a successful authentication message to the MU. Once the MU has been authenticated, the MU has to associate itself with the AP. The association is accomplished by the MU transmitting a request for association message to the AP, and the AP sending back a successful association message to the MU. The authentication and association transmission are specified in the Institute of Electrical and Electronics Engineers (IEEE) 802.11 standard. Once the MU has been properly authenticated and associated with the AP, the data transmission between the MU and the fixed backbone network can occur.

Data transmission between the various access points (APs) and their associated mobile units may involve large amounts of data which may take substantial amount of time and processing power to transmit over the air median. Such data transmissions are costly if the transmitted data is uncompressed. One possible solution to this problem is to always compress data prior to transmitting the data over the air. However, such an inflexible solution may not work under various circumstances because of the dynamic nature of data transmission in a wireless network due to various factors including the size and type of the data to be transmitted, the computational cost or overhead (in terms of time and processing power, etc.) in performing data compression at the sending end and data decompression at the receiving end, how much data waiting to be transmitted, and whether, for certain data streams, the benefit realized from compressing data outweighs the cost involved in performing data compression and decompression, etc. Thus, there is a need for the APs and the MUs to be able to transmit data in compressed format under appropriate conditions which will reduce the amount of time and processing power that it takes for data transmission in the wireless network.

SUMMARY OF THE INVENTION

According to one aspect of the present invention, a method is provided in which an access point and a mobile unit associated with the access point may optionally transmit compressed data to each other if the receiving unit is capable of handling data compression. In one embodiment, the access point communicates to one or more mobile units to inform them of the access point's compression capabilities. Upon being informed that the access point is capable of handling data compression, a mobile unit associated with the access point may optionally compress data prior to transmitting the data to the access point. The access point, upon receiving compressed data from the mobile unit, which indicates to the access point that the mobile unit is capable of handling data compression, may optionally compress data prior to transmitting the data to the mobile unit. In one embodiment, the access point considers various factors to decide whether to compress data prior to transmitting the data to the mobile unit. In one embodiment, the mobile unit also considers various factors to decide whether to compress data prior to transmitting the data to the access point.

Other aspects and features of the present invention will become apparent to those of ordinary skill in the art upon review of the following description of specific embodiments of the invention in conjunction with the accompanying claims and figures.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, and system for managing data compression in a wireless network. In one embodiment, an access point in the wireless network informs one or more mobile units in the network of its compression capability. For example, the access point may inform the mobile unit(s) in the wireless network of its compression capability by broadcasting a message to its associated mobile units. Alternatively, the access point can inform the mobile unit(s) of its compression capability by sending a test frame to a newly associated mobile unit. In one embodiment, the information communicated to the mobile unit(s) regarding the access point's compression capability also includes information regarding one or more specific data compression schemes or formats that are supported by the access point.

Upon being informed of the access point's compression capability, a mobile unit associated with the access point may optionally compress data prior to transmitting the data to the access point. The access point, upon receiving compressed data from the associated mobile unit, which indicates to the access point that the associated mobile unit is capable of handling data compression, may optionally compress data prior to transmitting the data to the associated unit.

In the above-described embodiment, the access point and/or the mobile unit may consider various factors or criteria to decide whether to compress the data prior to transmitting the data to the receiving unit. The various factors considered by the access point and/or the mobile unit may include, but are not limited or restricted to, any of the following factors: (1) a factor that indicates whether the other unit (the receiving unit) is capable of handling data compression; (2) a factor that indicates whether the sending unit can perform data compression according to one or more specific compression schemes that are supported by the receiving unit; (3) a factor that indicates whether the size of data to be transmitted exceeds a first threshold level; (4) a factor that indicates how much data are waiting in a queue to be transmitted; (5) a factor which indicates a relative position of the data to be compressed with respect to other data in the queue that are waiting to be transmitted; (6) a factor that indicates whether the type of the data to be compressed is suitable for data compression; (7) a factor that indicates whether previous compression gain exceeds a second threshold level; and (8) a factor which indicates a relative computational power of the sending unit to be used for data compression tasks.

The teachings of the present invention are applicable to data transmission between various access points and various mobile units in wireless networks. However, the teachings of the present invention should not be limited to data transmission and applications in wireless networks and should be applicable to any processing system in which effective and efficient management of data compression is needed to improve the speed of data transmission between the various components in the system.

In the following description, certain terminology is used to describe features of the present invention. For example, "logic" includes hardware and/or software module(s) that perform a certain function on incoming information. A "software module" is executable code such as an operating system, an application or an applet for example. The term "information" is defined as data, address, and/or control. For transmission, the information may be placed in a frame featuring a single packet or a series of packets.

In addition, a "link" is broadly defined as one or more information-carrying mediums to establish a communication pathway. Examples of the medium include a physical medium (e.g., electrical wire, optical fiber, cable, bus traces, etc.) or a wireless medium (e.g., air in combination with wireless signaling technology).

Figure 1:
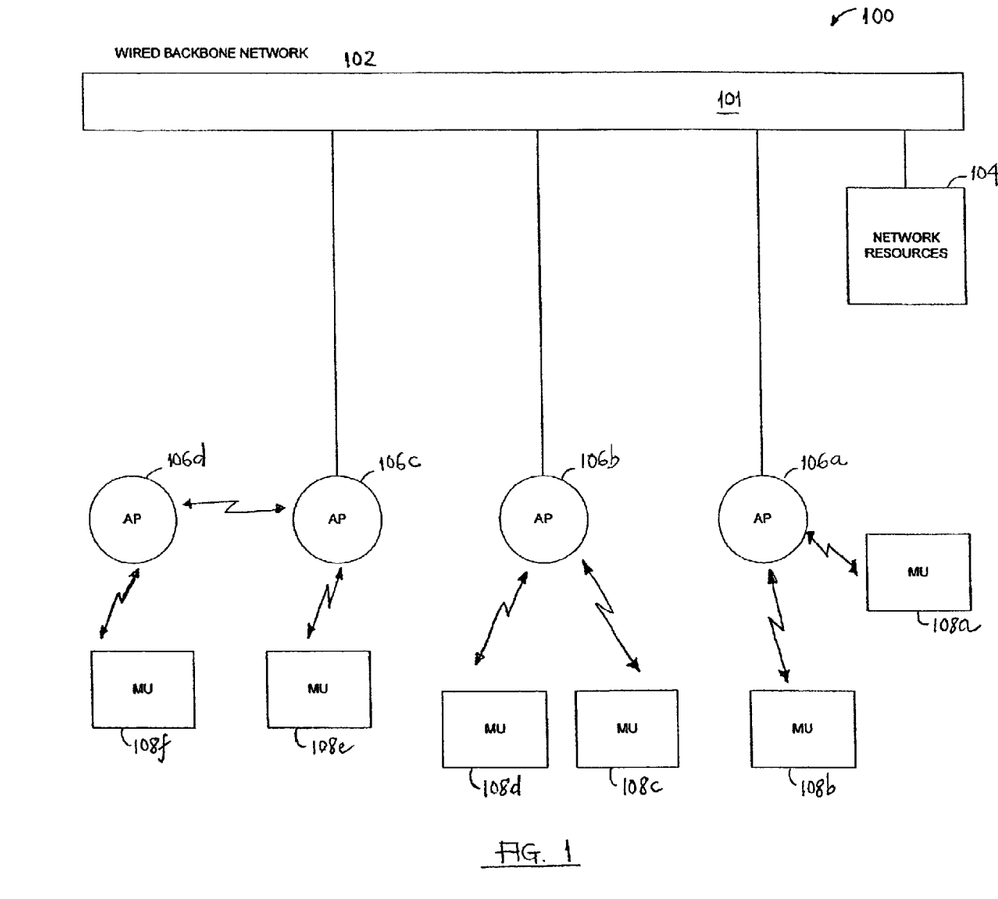
FIG. 1 is a block diagram of one embodiment of a wireless network in accordance with the teachings of the present invention.

Referring to FIG. 1, an exemplary first embodiment of a wireless network system 100 in accordance with the invention is illustrated. The wireless network system 100 comprises a link 101 based on a physical medium. Herein, the link 101 is part of a wired backbone network 102 that includes network resources 104 available for users of the network 100. The wireless network system 100 further includes one or more access points (APs) 106a–106d that communicate via a wireless link with one or more mobile units (MUs) 108a–108f. For this embodiment, four (4) APs 106a–106d communicate with six (6) MUs 108a–108f as described below.

Users using the MUs 108a–108f can access the network resources 104 via any of the APs 106a–106d, which are generally transparent bridges that link a wireless network defined by one or more MUs 108a–108f with the wired backbone network 102. The MUs 108a–108f communicate with the APs 106a–106d typically using a standardized protocol, such as the IEEE 802.11 protocol.

A "mobile unit" (MU) is defined herein as any electronic device comprising (1) logic for processing information (e.g., a processor, microcontroller, state machine, etc.) and (2) a wireless transceiver for receiving information from and transmitting information to an access point (AP) or another wireless unit (MU). Examples of an "electronic device" include a computer (e.g., desktop computer, laptop computer, hand-held computer such as a personal digital assistant "PDA", etc.), communications equipment (e.g., pager, telephone, facsimile machine, etc.), a television set-top box, or appliances such as refrigerator pads, electronic picture frames, alarm detectors, water detectors, and the like. As described in detail below, an MU operated according to the teachings of the present invention may include hardware and/or software logic to perform data compression/decompression with respect to the data transmitted to/received from an AP with which the respective MU is associated.

An "access point" (AP) is an electronic device that provides a bi-directional connection between one or more MUs and a network such as the wired backbone network 102. However, an AP could also have a wireless connection back to the wired backbone network 102, such as AP 106d, which has a wireless link to the backbone network 102 via another AP 106c. The wired backbone network 102 can be of any type, including an Ethernet, a token ring, or an asynchronous transfer mode (ATM) network. As described in detail below, the AP of the present invention includes hardware and/or software logic to perform data compression/decompression with respect to the data transmitted to/received from the one or more mobile units in the wireless network system 100.

Figure 2:
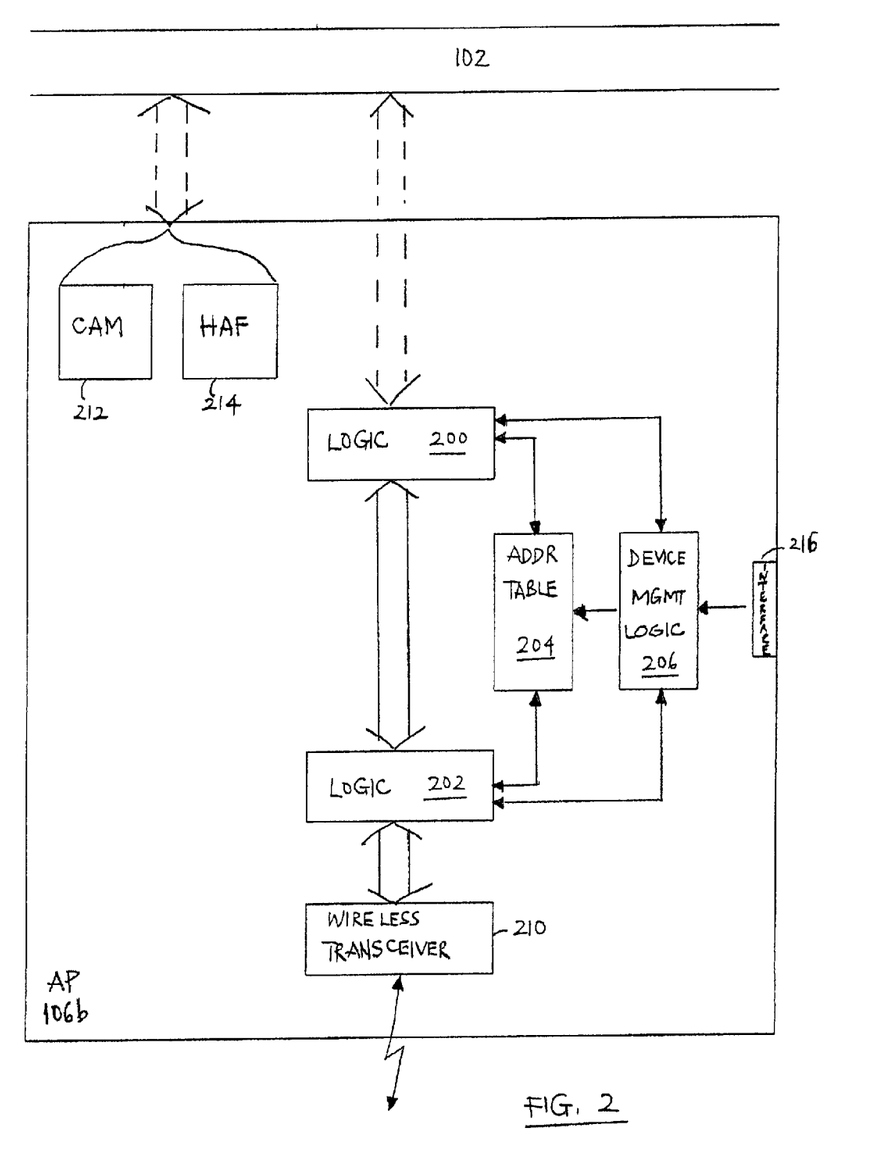
FIG. 2 is a block diagram of one embodiment of an access point (AP) of a wireless network.

Referring now to FIG. 2, an exemplary embodiment of an access point (AP) is shown. For illustrative purposes, the access point is represented by AP 106b and differs in function from the access points described in U.S. Pat. No. 5,987,062. As shown, AP 106b comprises logic 200 and 202, an address table 204, a device management logic 206, and a wireless transceiver interface 210. In particular, the logic 200 is used to determine whether certain information from the wired backbone network 102 is destined for one or more of the MUs. The address table 204 includes Media Access Control (MAC) addresses for all of the mobile units associated with the AP 106b such as MUs 108c and 108d of FIG.

1. In the special case of all broadcast or some multicast packets, the packets are addressed to all or some of the MUs associated with the AP 106b on a "best efforts" basis.

Similarly, as information from the MUs is received by the wireless transceiver 210, the logic 202 monitors addresses within this information against the contents of the address table 204. One reason is that only information from authenticated and associated mobile units (e.g., MUs 108c and 108d) is accepted. Hence, if information is received from a non-authenticated mobile unit, the information will not be forwarded to the wired backbone network 102 of FIG. 1. If the information is received from an authenticated mobile unit, the logic 202 subsequently transmits the information to the logic 200 for routing to the wired backbone network 102.

In the event that the fixed backbone network 102 of FIG. 1 has a substantially larger data rate than the wireless network, content addressable memory (CAM) 212 and a hardware address filter (HAF) 214 are employed within the AP 106b. The CAM 212 and HAF 214 are in communication with the wired backbone network 102 and collectively filter information at the physical layer. For example, the HAF 214 examines an incoming packet from the wired backbone network 102 to determine if the destination MAC address is in its own internal table. The internal table includes MAC addresses of devices reachable to the wired backbone network 102, namely directly coupled to the network 102 or indirectly through another AP for example. Thus, the logic 200 needs only process a portion of the information routed over the wired backbone network 102.

In one embodiment the device management logic 206 provides a mechanism for adjusting the various parameters and controlling the functionality of the AP 106b. In one embodiment, the device management logic 206 may be configured via a port interface 216 within the AP 106b. The port interface 216 (e.g., a serial port) provides a direct connection to the AP 106b. Other mechanisms include (1) Simple Network Management Protocol (SNMP) management tools such as OPTIVITY® by Nortel Networks Limited of Montreal, Canada, (2) TELNET, or (3) web-based management software.

As will be described in more detail below, the AP 106b of the present invention includes logic that may be part of the device management logic 206 for performing and managing data compression/decompression with respect to the data transmitted to/received from its associated mobile units. In one embodiment, the device management logic 206 informs the mobile units associated with the AP 106b of the AP's compression capability (e.g., that the AP 106b is capable of handling data compression/decompression). In one embodiment, the AP compression capability information may also include information regarding one or more specific data compression schemes, formats, algorithms, etc. that the AP 106b can support. In one embodiment, the device management logic 206 manages data compression. Specifically, the management of data compression includes deciding whether data should be compressed by the AP 106b before transmitting to its associated mobile units, based upon various factors described in more detail below.

Referring back to FIG. 1, in a typical scenario, an MU associates itself with one of the APs to communicate with the wired backbone network 102. For instance, in the example shown in FIG. 1, MUs 108a and 108b are associated with AP 106a, MUs 108c and 108d are associated with AP 106b, MU 108e is associated with AP 106c, and MU 108f is associated with wireless AP 106d. Which AP a mobile unit (MU) is associated with can depend on many factors, including signal quality, load balancing, restricted links and other factors. The AP that a particular MU is associated with can change, such as when the MU "roams" from the coverage area of a particular AP to a coverage area of another AP. From the standpoint of the user using the MU, this change in associated AP is transparent.

Figure 3:
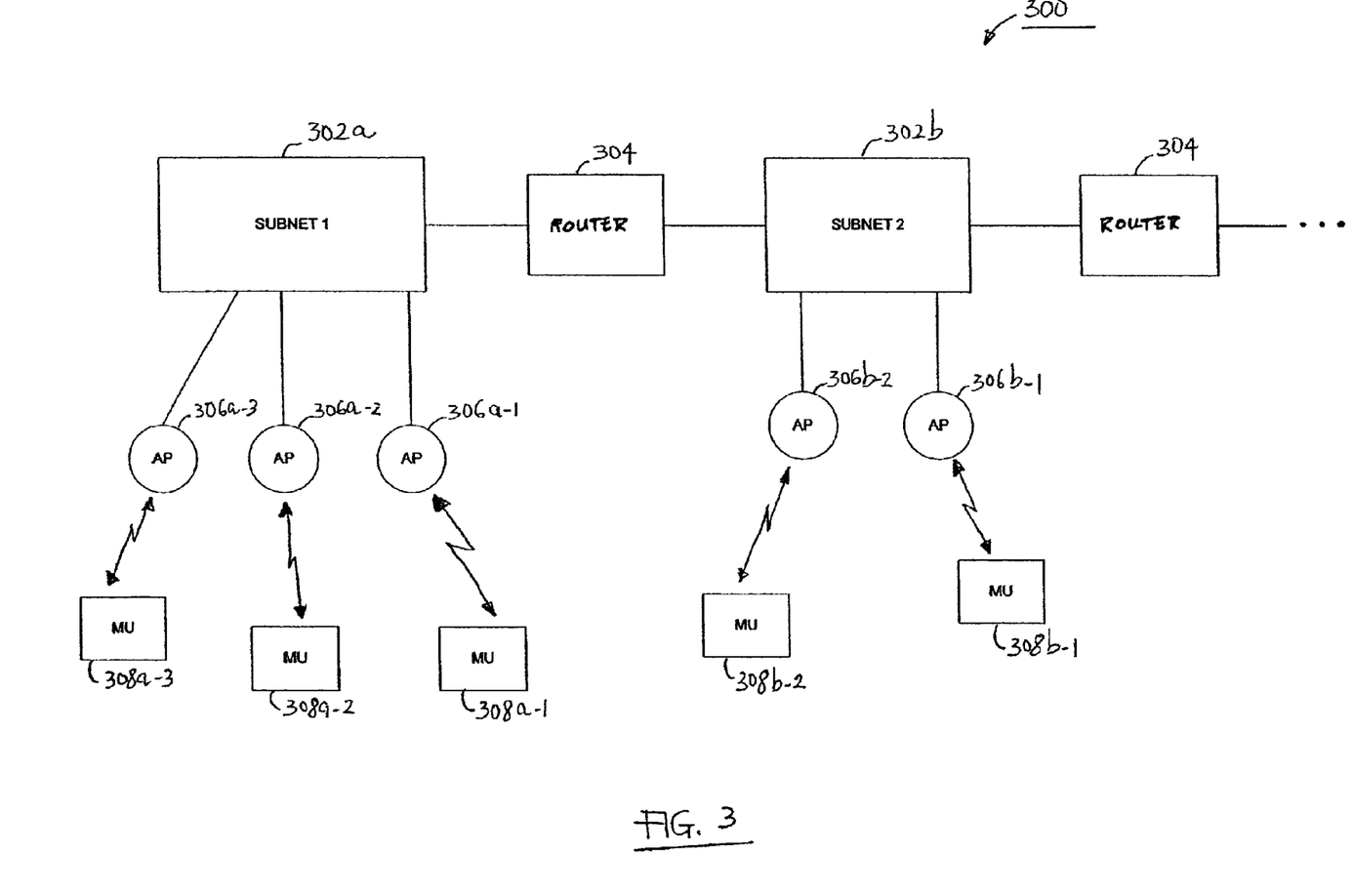
FIG. 3 is a block diagram of another embodiment of a wireless network according to the teachings of the present invention.

FIG. 3 illustrates a second exemplary embodiment of a wireless network system 300 in accordance with the invention. The wireless network system 300 comprises two or more sub-networks 302a and 302b, which communicate with each other by way of a router 304. The sub-networks 302a and 302b can be any wired backbone network, including Ethernet, token ring, and an asynchronous transfer mode (ATM) network. The sub-networks 302a and 302b need not be of the same type, for instance, sub-network 302a can be an Ethernet, and sub-network 302b can be a token ring. Each sub-network 302a and 302b has one or more APs for communicating with the MUs. For instance, sub-network 302a includes APs 306a-1, 306a-2, 306a-3 for communicating respectively with MUs 308a-1, 308a-2, and 308a-3. Sub-network 302b includes APs 306b-1 and 306b-2 for communicating respectively with MUs 308b-1 and 308b-2. In this network, an MU associated with an AP on a particular sub-network (e.g. sub-network 302a) can also change its association to an AP on another sub-network (e.g. sub-network 302b) by roaming as discussed above or other circumstances.

As described above, data transmission between the various access points (APs) and their associated mobile units may involve large amounts of data which may take substantial amount of time and processing power to transmit. Such data transmissions are costly if the data is transmitted in uncompressed format. One possible solution to this problem is to always compress data prior to transmitting the data over the air. However, such an inflexible solution may not work under various circumstances because of the dynamic nature of data transmission in a wireless network due to various factors including the size and type of the data to be transmitted, the computational cost or overhead (in terms of time and processing power, etc.) in performing data compression at the sending end and data decompression at the receiving end, how much data waiting to be transmitted, and whether, for certain data streams, the benefit realized from compressing data outweighs the cost involved in performing data compression and decompression, etc. Thus, there is a need for the APs and the MUs to be able to transmit data in compressed format under appropriate conditions which will reduce the amount of time and processing power that it takes for data transmission in the wireless network.

Referring again to FIG. 1, for illustration and explanation purposes, the discussion herein is focused on the operations of and interactions between the access point (AP) 106b and one of its associated mobile unit (MU) 108d. However, it should be appreciated by one skill in the art that everything discussed herein is equally applicable to other APs and MUs shown in FIG. 1 and FIG. 3, as well as other network configurations. In one embodiment, the system as illustrated in FIG. 1 can have the mobile units auto-detect whether the AP is capable of performing data compression (i.e., whether data compression is enabled at the AP). In one embodiment, to accomplish this, an AP such as the AP 106b can broadcast a message, for example, in an interaccess-point-protocol (IAPP) packet, to the associated MUs (e.g., MU 108c and MU 108d) to inform these associated MUs of its compression capability (e.g., that the AP 106b is capable of handling data compression). Alternatively, the AP 106b may send a test frame (e.g., an empty frame) to a newly associated mobile unit to inform the newly associated mobile unit that the AP 106b is capable of handling data compression. The MU, upon receiving the test frame (or the IAPP packet) now knows that the AP 106b can support data compression. Based on this knowledge of the AP compression capability, an associated MU (e.g., MU 108d) can begin to compress data frames that it is sending to the AP 106b. In one embodiment, a bit in the header of every data frame can be used to indicate whether the frame contains regular (uncompressed) data or compressed data. Alternatively, one could use a special 802.2 encapsulation such as AAAA030020D8xxyy to tag compressed frames. Upon receiving the compressed data frames from the MU (e.g., MU 108d), the AP 106b now knows that this particular MU is capable of data compression. Accordingly, the AP 106b can begin sending compressed data frames to the MU 108d. As such, each unit or component in the wireless network system 100 or the wireless network system 300 can automatically detect whether another unit to which it wants to transmit data is capable of handling data compression. Thus it is not necessary to have user visible controls or user knowledge to determine whether a particular unit operating in the wireless network system 100 or the system 300 is capable of handling data compression/decompression. In other words, according to the teachings of the present invention, the determination of the data compression capability of each unit in the system and the performance of data compression by each unit to improve data transmission throughput can be accomplished without the user control or user knowledge and therefore is transparent to the user.

As mentioned above, because of the dynamic nature of various aspects of the data transmission between various units within the wireless network system, it may not be beneficial (e.g., system performance may not improve) to always compress data before transmission. In other words, under certain circumstances, the costs in terms of time and processing power of performing data compression at the sending end and performing data decompression at the receiving end may exceed the benefits obtained from transmitting compressed data (e.g., time reduction resulting from transmitting compressed data versus transmitting uncompressed data). For example, if the size of a certain data packet to be transmitted is not large enough, it may take longer to compress the data packet at the sending end, transmitting the compressed data packet, and decompress the data packet at the receiving end, compared to the time that it would take to just send the data packet without doing any compression/decompression.

As another example, assuming that the type of the data packet to be transmitted is such that it does not contain much redundant data, it may not be beneficial to spend the time and processing power to compress and decompress the data in this case because the improvement gain (i.e., the size reduction) would be small compared to the cost involved in doing compression/decompression. As yet another example, in certain cases, depending on the particular compression scheme or algorithm used and/or the type of data to be transmitted, it may take much longer to decompress the compressed data at the receiving end which could offset or greatly diminish any potential gain from transmitting the data in compressed format.

As described in detail below, the present invention provides a method, apparatus, and system for managing data compression in the wireless network effectively and efficiently to maximize the system improvement from transmitting data in compressed format, taken into consideration various factors that may impact the cost and the benefit of data compression/decompression.

Referring again to FIG. 1, an AP in the system 100 such as the AP 106b can inform the mobile units in the system of its compression capability by either sending a test frame (e.g., an empty frame) to a newly associated mobile unit or by broadcasting a message in an IAPP packet to its associated mobile units. An MU in the system such as the MU 108d which is associated with the AP 106b, upon hearing from the AP 106b that it is capable of handling data compression, may optionally transmit compressed data to the AP 106b. The AP 106b, upon receiving compressed data frames from the associated mobile unit, now knows that the associated mobile unit is capable of data compression and may optionally transmit compressed data to the associated mobile unit. In one embodiment, an access point such as the AP 106b may decide whether to compress data before transmitting the data to an associated mobile unit such as the MU 108d. In one embodiment, a mobile unit such as the mobile unit 108d may decide whether to compress the data before transmitting the data to the associated AP (i.e., AP 106b). In one embodiment, the AP 106b and/or the mobile unit 108d may make the decision whether to compress the data based upon one or more various factors or criteria that are described in more detail below.

Depending upon the particular implementations and applications of the present invention, the number of factors to be considered by the sending unit (either the access point or the mobile unit) in deciding whether to compress the data may vary. Similarly, the factors may be weighted equally or differently based upon the particular implementations and/or applications. Likewise, some of the factors described herein may be considered optional while other factors may be considered as mandatory (e.g., if certain requirements or factors are not met then the transmitting unit (AP or MU) will not compress the data). For example, a particular implementation of the teachings of the present invention may require that data packets that are smaller than a certain size not be compressed because the potential benefit to be realized by compressing the data prior to transmission would not outweigh the cost of compressing and decompressing the data. As another example, a different implementation may choose not to compress data of a particular type (e.g., video or audio, etc.) regardless of the size of the data packets. Accordingly, the various factors or requirements described herein are for illustrative and explanation purposes and should not limit the scope of the present invention.

In one embodiment, the various factors or criteria considered by the transmitting unit (AP or MU) to decide whether to compress data before transmitting the data to the receiving unit (MU or AP) may include, but are not limited or restricted to, any of the following factors or criteria:

Whether the transmitting unit can perform data compression according to the one or more specific data compression/decompression schemes or algorithms that are supported by the associated receiving unit.

The size of the data packet(s) that are to be transmitted by the transmitting unit to the receiving unit. In one embodiment, the transmitting unit will not compress data frames that are shorter than a certain or predetermined size due to the cost involved (e.g., time and processing power, etc.) in compressing/decompressing the data. If the data frames are shorter than a predetermined threshold level, then the benefit is deemed insufficient to spend the time and the processing power to compress and decompress the data. As explained above, in these instances, it may take longer to compress, transmit, and then decompress. It would better in these instances just to send the raw, uncompressed data.

Whether wired equivalent privacy (WEP) is turned on. If WEP is turned on, there is no need to do compression because the redundancy in the data has already been removed from the data by the encryption process.

How much data waiting in the transmit queue to be transmitted to the receiving unit and the relative position of the data to be compressed with respect to other data in the transmit queue. This factor or criterion to be considered by the transmitting unit is also referred to as checking the queue depth herein. More specifically, it would make sense to compress data packets that will be waiting in the transmit queue for a while (e.g., waiting for their turn to be transmitted by the mobile unit), based upon the queue depth at the time the data packet(s) are added to the queue. This would prevent the medium from being unused while preparing a compressed packet. However, as mentioned above, this may not be the determining factor because there may be circumstances where it could be more efficient to let the medium go unused if the net compression-gain is high. As an example, assuming that there are three packets that have just been added to the transmit queue, it would make sense in this case to not spend time and power to do the compression on the first packet because it would hold up the transmission process and the medium would go unused for a time period corresponding to the time that it would take the transmitting unit to compress the first packet. In this case, it would make sense to just go ahead and send the first packet in uncompressed format. However, while the first packet is being transmitted, the transmitting unit now can take advantage of this transmission time period to compress the other two data packets that are waiting in the queue for their turn to be transmitted. The idea here is to reduce the time and power spent doing compression because doing compression might slow down data traffic and increase data transmission latency between the respective units. In the event that a data packet is ready for transmission before the compression is done then there may be different ways to handle this situation. In one embodiment, if the compression is performed in the same buffer then the transmitting unit will not be able to send the original data, it has to wait for the compression to finish. In another embodiment, if the data is being compressed into a different buffer, then the original data can be transmitted and the background compression processing can be cancelled.

Whether the data is suitable for compression. As mentioned above, certain types of data such as video or audio data, etc. may not contain a lot of redundancy. Therefore the benefits to be gained by compressing these types of data probably will not justify the costs for performing compression/decompression. In these instances, it would be better to not compress the data. Moreover, in certain cases, data to be transmitted by the mobile unit may have already been compressed before getting to the mobile unit. In such cases, there is no need to compress the data. For example, if the data to be transmitted has been detected or explicitly tagged as compressed data (e.g., compressed video data), there is no need for the mobile unit to compress it any further.

Another factor or criterion to be considered is whether the current data stream is compressing well (e.g., detecting compressible data). The compression should be done more at times when the data stream is compressing well. The idea here is that there will be times during the use of the network when the data being exchanged is compressible and there will be other times when the data is not so compressible. In other words, the use of compression would be more beneficial if the system can detect time periods when the users are transmitting data that are compressible compared to time periods when they are transmitting data that are not so compressible. Specifically, the transmitting unit may want to detect poor compression-gain and avoid wasting time and processing power to compress packets that probably would not get much smaller.

In one embodiment, this can be accomplished by monitoring the compression gain with respect to the packets that have been compressed. In one embodiment, a threshold level with respect to compression-gain may be used by the transmitting unit to determine whether compression-gain or compression ratio with respect to the data stream being transmitted is sufficient to justify the costs of doing compression/decompression. For example, if the compression-gain of a previous packet in the current data stream is ½ of the original size of the packet then it is likely that such substantial compression-gain could be achieved with respect to other packets in the data stream. However, if the compression-gain of a previous packet in the data stream is only 1/100 of the original size of the packet then it is likely that compression-gain with respect to other packets in the data stream would also be very small or minimal. In this instance, the transmitting unit may decide that the data stream being transmitted during this time period is not so compressible and not bother with doing compression during this time period.

Another factor that may be considered by the transmitting unit in deciding whether to compress data is its processing or computational power. For example, if there are other higher priority tasks that need to be performed by the transmitting unit then it may decide not to perform compression work in order to expedite other high priority tasks.

Based upon the various factors discussed above, it should be appreciated by one skilled in the art that there is a tradeoff between compressing data before transmitting and just transmitting without doing compression. The data transmission or data traffic should be monitored to determine when to compress and when not to compress since the benefits of doing compression should, at least on the average, outweigh the costs of doing so in order to improve the system performance. For example, if a file transfer or email downloading is being performed, there will be a good packet-to-packet locality of compressibility. Furthermore, in one embodiment, how much time is being saved by doing compression can be monitored to determine whether doing compression is beneficial under various circumstances. Note also that the amount of time a receiver will take to decompress a packet may need to be taken into account, depending upon the particular implementations and applications of the present invention.

In one embodiment, it may be useful to have the various units in the system (e.g., AP 106*b* and its associated MUs) informing each other of how much time they are spending doing compression/decompression. This information may be utilized by the units in deciding as to whether and when to compress. As mentioned above, latency-sensitive traffic may be detectable or explicitly taggable. For certain kinds of compression, it may need to be determined whether to wait a little longer to begin sending a set of packets (because the whole set of packets will finish sooner than if the unit had started transmitting the uncompressed data right way) or to start the transmission of data right away. Accordingly, in one embodiment, the decision whether to compress may be based, at least in part, upon the quality of service (QoS)

latency requirements. In addition, in one embodiment, certain values referred to as QoS code-points may be used to explicitly tag data that should not be compressed, for example compressed video data which has long packets but is known in advance not to be compressible further.

Depending upon the specific implementations and applications of the present invention as well as other various factors that are described herein, various compression schemes or algorithms may be considered to achieve acceptable or desirable compression gain. In general, compression algorithms that are computationally expensive require much processing and build a "dictionary" based upon the historical data. These methods or algorithms may be good for long data streams. However, at the network level where compression is to take place as described herein (e.g., layer 2), each packet is to be considered individually and separately from other packets. The history is to be discarded at the end of the compressed data frame. Accordingly, a quick compression scheme that is not dependent upon the construction of a good history or dictionary may be appropriate to be used in this situation. Such a compression scheme may not yield the best compression results. However, the compression ratio or compression gain on the individual packets will be fair, depending upon the amount of redundancy in each individual packet. For example, compression schemes that have been used for modems may be good candidates to be used. These compression schemes or algorithms may include MNP-5, MNP-10, v.42bis, etc. Other available compression schemes or algorithms may be considered so long as they are suitable for the purposes of compressing individual packets at the network level described herein (layer 2).

In one embodiment, the teachings of the present invention can be implemented in different places, at different levels. For instance, compression could also be done at a level above the wireless LAN, e.g., in a Microsoft filter (function) driver. The compression would then be transparent. In this instance, the data would go through that filter driver and be compressed by that driver. Furthermore, in a VPN environment, it may be appropriate to compress the data before applying the VPN tunneling wrapper. If tied to Microsoft driver architecture, this embodiment would at least be good for end-to-end Microsoft-pure networks.

Figure 4:
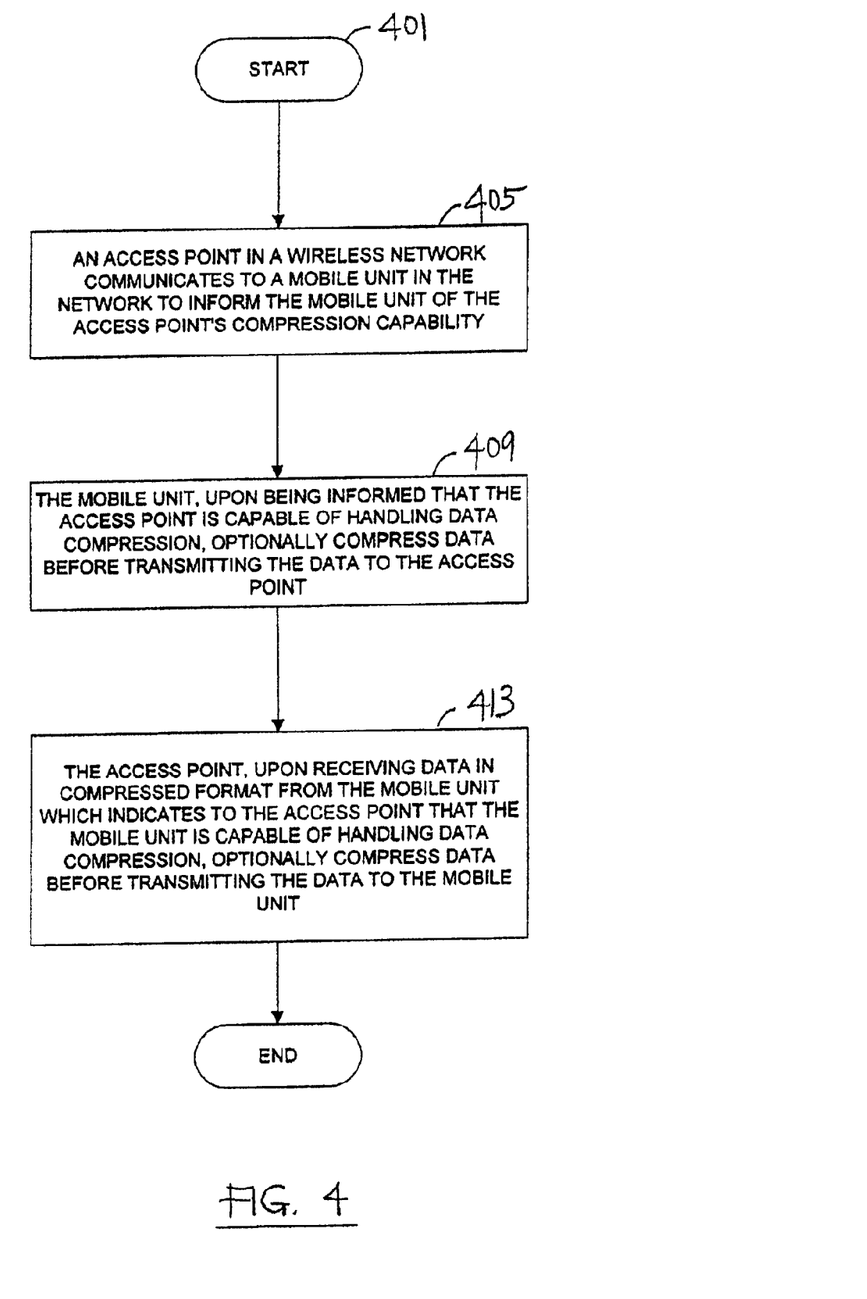
FIG. 4 shows a flow diagram of one embodiment of a method for enabling data compression in a wireless network in accordance with the teachings of the present invention.

FIG. 4 illustrates a high level flow diagram of one embodiment of a method according to the teachings of the present invention. The method 400 starts at block 401 and proceeds to block 405. At block 405, an access point such as the AP 106b in a wireless network system as shown in FIG. 1 or FIG. 3 informs one or more mobile units in the system of its compression capability. As described above, information concerning the compression capability may include information regarding the specific compression schemes or algorithms that the access point can support. In one embodiment, as described above, the access point can inform the mobile units of its compression capability by either sending a test frame (e.g., an empty frame) to a newly associated mobile unit or by broadcasting a message in an IAPP packet to its associated mobile units. At block 409, an MU in the system such as the MU 108d which is associated with the AP 106b, upon hearing from the AP 106b that the AP 106b is capable of handling data compression, may optionally transmit compressed data to the AP 106b. At block 413, the AP 106b, upon receiving compressed data frames from the associated mobile unit, now knows that the associated mobile unit is capable of data compression. Upon learning this, the AP 106b may optionally transmit compressed data to the associated mobile unit.

Figure 5:
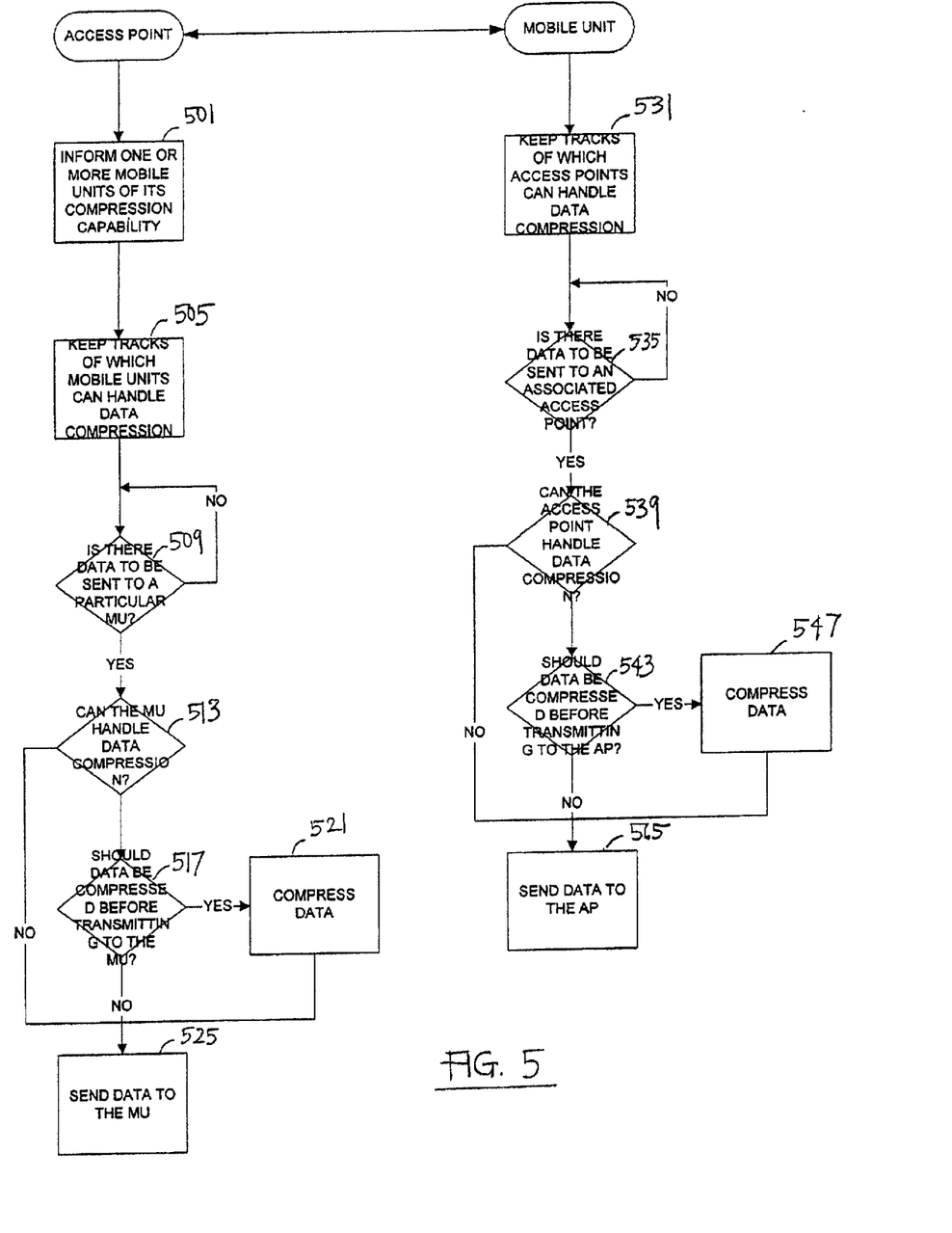
FIG. 5 shows a flow diagram of one embodiment of a method for managing data compression/decompression in a wireless network according to the teachings of the present invention.

FIG. 5 shows a flow diagram of one embodiment of a method for managing data compression/decompression in a wireless network as shown in FIG. 1 or FIG. 3. This flow diagram illustrates the various tasks or functions performed by an access point (e.g., AP 106b) and one of its associated MUs (e.g., MU 108d) with respect to the management of data compression in the data transmission process. At block 501, the AP informs one or more mobile units in the system of its compression capability, as described in detail above. At block 505, the AP keeps track of which mobile units can handle data compression/decompression. As discussed above, in one embodiment, the AP knows that a particular MU is capable of data compression once it receives compressed data frames from that particular MU. At decision block 509, the AP proceeds to block 513 if there is data to be transmitted to a particular MU. At decision block 513, the AP determines whether that particular MU is capable of data compression. The AP proceeds to block 517 if the MU can handle data compression. Otherwise, the AP proceeds to block 525. At decision block 517, the AP decides whether the data should be compressed before transmission, based upon various factors or criteria described above. The AP then proceeds to block 521 to compress the data if the AP decides, based upon the various factors described herein, that the data should be compressed. Otherwise the AP will proceed to block 525 without compressing the data. At block 525, the data is transmitted to the MU.

Referring again to FIG. 5, at block 531, the MU keep tracks of which access points in the system can handle data compression. As described above, the various APs in the system can inform the various MUs of their compression capability by either broadcasting a message to their associated MUs or sending a test frame to newly associated MUs. In one embodiment, the MU can maintain a list to keep track of which APs in the system are capable of handling compression. At block 535, the MU proceeds to block 539 if there is data to be transmitted to its associated AP. At decision block 539, the MU determines whether the associated AP is capable of data compression. The MU proceeds to block 543 if the AP can handle data compression. Otherwise, the MU proceeds to block 565. At decision block 543, the MU decides whether the data should be compressed before transmission, based upon various factors or criteria described above. The MU then proceeds to block 547 to compress the data if the MU decides, based upon the various factors described herein, that the data should be compressed. Otherwise, the MU will proceed to block 565 without compressing the data. At block 565, the MU transmits the data to its associated AP.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
    informing one or more mobile units within a wireless network that a first access point is capable of handling data compression;
    informing the first access point that a first mobile unit is capable of handling compression;
    optionally compressing data at the first mobile unit prior to transmitting the data to the first access point, by deciding whether to compress the data based upon at least one factor selected from the group consisting of a first factor indicating whether the first access point is capable of handling data compression, a second factor indicating whether the first mobile unit can perform data compression according to one or more specific compression schemes that are supported by the first access point, a third factor indicating whether the size of data to be transmitted exceeds a first threshold level, a fourth factor indicating how much data is waiting in a queue to be transmitted, a fifth factor indicating a relative position of the data to be compressed with respect to other data in the queue that is waiting to be transmitted, a sixth factor indicating whether the type of the data to be compressed is suitable for data compression, a seventh factor indicating whether previous compression gain exceeds a second threshold level, and an eighth factor indicating a relative computational power of the first mobile unit to be used for data compression tasks; and optionally compressing data at the first access point prior to transmitting the data to the first mobile unit.

2. The method of claim 1 wherein the informing of the one or more mobile unites includes broadcasting a message by the first access point to inform the one or more mobile units of its compression capability.

3. The method of claim 1 wherein the informing of the one or more mobile units includes sending a test frame by the first access point to a newly associated mobile unit of the one or more mobile units to inform the newly associated mobile unit of its compression capability.

4. The method of claim 1 wherein the informing of the one or more mobile units includes informing the one or more mobile units of specific data compression schemes that are supported by the first access point.

5. The method of claim 1 wherein the informing of the first access point includes sending compressed data to the first access point by the first mobile unit.

6. A method comprising:

informing one or more mobile units within a wireless network that a first access point is capable of handling data compression;

informing the first access point that a first mobile unit is capable of handling compression;

optionally compressing data at the first mobile unit prior to transmitting the data to the first access point; and optionally compressing data at the first access point prior to transmitting the data to the first mobile unit, by deciding whether to compress the data based upon at least one factor selected from the group consisting of a first factor indicating whether the first mobile unit is capable of handling data compression, a second factor indicating whether the first access point can perform data compression according to one or more specific compression schemes that are supported by the first mobile unit, a third factor indicating whether the size of data to be transmitted exceeds a first threshold level, a fourth factor indicating how much data is waiting in a queue to be transmitted, a fifth factor indicating a relative position of the data to be compressed with respect to other data in the queue that is waiting to be transmitted, a sixth factor indicating whether the type of the data to be compressed is suitable for data compression, a seventh factor indicating whether previous compression gain exceeds a second threshold level, and an eighth factor indicating a relative computational power of the first access point to be used for data compression tasks.

7. The method of claim 6 wherein the informing of the first access point includes a first mobile unit informing the first access point of its compression capability by sending a message to the first access point.

8. A method comprising:

communicating from a first access point to a first mobile unit in a wireless network to inform the first mobile unit that the first access point is capable of handling data compression: determining whether to compress data based upon one or more factors being indicative of whether the benefit to be obtained from transmitting compressed data exceeds the cost associated with compressing the data, the one or more factors considered by the first access point include at least one factor selected from the group comprising a first factor indicating whether the first access point is capable of handling data compression, a second factor indicating whether the first mobile unit can perform data compression according to one or more specific compression schemes that are supported by the first access point, a third factor indicating whether the size of data to be transmitted exceeds a first threshold level, a fourth factor indicating how much data is waiting in a queue to be transmitted, a fifth factor indicating a relative position of the data to be compressed with respect to other data in the queue that is waiting to be transmitted, a sixth factor indicating whether the type of the data to be compressed is suitable for data compression, a seventh factor indicating whether previous compression gain exceeds a second threshold level, and an eighth factor indicating a relative computational power of the first mobile unit to be used for data compression tasks;

upon being informed that the first access point is capable of handling data compression, optionally transmitting data in compressed format to the first access point by the first mobile unit; and upon receiving compressed data from the first mobile unit which indicates to the first access point that the first mobile unit is capable of handling data compression, optionally transmitting data in compressed format to the first mobile unit by the first access point.

9. The method of claim 8 wherein the one or more factors considered by the first access point include a factor indicating whether the first mobile unit is capable of handling data compression.

10. The method of claim 8 wherein the one or more factors considered by the first access point include a factor indicating whether the first access point can perform data compression according to one or more specific compression schemes that are supported by the first mobile unit.

11. The method of claim 8 wherein the one or more factors considered by the first access point include a factor indicating whether the size of data to be transmitted exceeds a first threshold level.

12. The method of claim 8 wherein the one or more factors considered by the first access point include a factor indicating how much data is waiting in a queue to be transmitted.

13. The method of claim 8 wherein the one or more factors considered by the first access point include a factor indicating a relative position of the data to be compressed with respect to other data in the queue that is waiting to be transmitted.

14. The method of claim 8 wherein the one or more factors considered by the first access point include a factor indicating whether the type of the data to be compressed is suitable for data compression.

15. The method of claim 8 wherein the one or more factors considered by the first access point include a factor indicating a relative computational power of the first access point to be used for data compression tasks.

16. A method comprising:
communicating from a first access point to a first mobile unit to inform the first mobile unit that the first access point is capable of handling data compression; upon being informed that the first access point is capable of handling data compression, optionally transmitting data in compressed format by the first mobile unit to the first access point, the first mobile unit determines whether to compress data based upon one or more factors being at least one factor selected from the group comprising a first factor indicating whether the first access point is capable of handling data compression, a second factor indicating whether the first mobile unit can perform data compression according to one or more specific compression schemes that are supported by the first access point, a third factor indicating whether the size of data to be transmitted exceeds a first threshold level, a fourth factor indicating how much data is waiting in a queue to be transmitted, a fifth factor indicating a relative position of the data to be compressed with respect to other data in the queue that is waiting to be transmitted, a sixth factor indicating whether the type of the data to be compressed is suitable for data compression, a seventh factor indicating whether previous compression gain exceeds a second threshold level, and an eighth factor indicating a relative computational power of the first mobile unit to be used for data compression tasks;
upon receiving compressed data from the first mobile unit which indicates to the first access point that the first mobile unit is capable of handling data compression, optionally transmitting data in compressed format by the first access point to the first mobile unit.

17. The method of claim 16 wherein the one or more factors considered by the first mobile unit include a factor indicating whether the first access point is capable of handling data compression.

18. The method of claim 16 wherein the one or more factors considered by the first mobile unit include a factor indicating whether the mobile unit can perform data compression according to one or more specific compression schemes that are supported by the first access point.

19. The method of claim 16 wherein the one or more factors considered by the first mobile unit include a factor indicating whether the size of data to be transmitted exceeds a first threshold level.

20. The method of claim 16 wherein the one or more factors considered by the first mobile unit include a factor indicating how much data are waiting in a queue to be transmitted.

21. The method of claim 16 wherein the one or more factors considered by the first mobile unit include a factor indicating a relative position of the data to be compressed with respect to other data in the queue that are waiting to be transmitted.

22. The method of claim 16 wherein the one or more factors considered by the first mobile unit include a factor indicating whether the type of the data to be compressed is suitable for data compression.

23. The method of claim 16 wherein the one or more factors considered by the first mobile unit include a factor indicating a relative computational power of the first mobile unit to be used for data compression tasks.

24. An access point in a wireless local area network comprising:
logic to inform one or more mobile units operated within the network that the access point is capable of handling compression;
logic to determine whether a mobile unit is capable of handling compression; and
logic to transmit data frames in compressed format to the mobile unit that is capable of handling compression, the logic includes logic to decide whether to compress one or more frames prior to transmitting the one or more frames to the mobile unit by determining whether a compression threshold is met based upon at least one factor selected from the group comprising (i) a first factor indicating whether the particular mobile unit is capable of handling data compression, (ii) a second factor indicating whether the access point can perform data compression according to one or more specific compression schemes that are supported by the particular mobile unit, (iii) a third factor indicating whether the size of data to be transmitted exceeds a first threshold level, (iv) a fourth factor indicating how much data are waiting in a queue to be transmitted, (v) a fifth factor indicating a relative position of the data to be compressed with respect to other data in the queue that are waiting to be transmitted, (vi) a sixth factor indicating whether the type of the data to be compressed is suitable for data compression, (vii) a seventh factor indicating whether previous compression gain exceeds a second threshold level, and (viii) an eighth factor indicating a relative computational power of the access point to be used for data compression tasks.

25. The access point of claim 24 wherein the logic to inform comprises:
logic to broadcast the access point's compression capability to the one or more mobile units.

26. The access point of claim 24 wherein the logic to inform comprises:
logic to send a test frame to a particular mobile unit to inform that particular mobile unit of the access point's compression capability.

27. The access point of claim 24 wherein information regarding the access point's compression capability further includes information indicating specific types of compression schemes that are supported by the access point.

28. The access point of claim 24 wherein the logic to determine whether a particular mobile unit is capable of handling data compression comprises:
logic to identify whether a data frame received from the particular mobile unit is compressed.

29. The access point of claim 24 wherein the logic to optionally transmit compressed data frames comprises:
logic to decide whether to compress one or more particular frames prior to transmitting the one or more particular frames to a particular mobile unit; and
logic to compress the one or more particular data frames upon deciding that the one or more particular data frames should be compressed.

30. The access point of claim 24 wherein the logic to decide whether to compress including:
logic to determine whether a compression threshold is met based upon one or more factors being indicative of whether the one or more particular data frames to be transmitted should be compressed prior to transmission.

31. A mobile unit operated within a wireless local area network, comprising:
- logic to determine whether an access point with which the mobile unit is associated is capable of handling compression; and
- logic to transmit data in a compressed format to the access point based upon analysis of at least one factor selected from the group comprising a first factor indicating whether the access point is capable of handling data compression, a second factor indicating whether the mobile unit can perform data compression according to one or more specific compression schemes that are supported by the access point, a third factor indicating whether the size of data to be transmitted exceeds a first threshold level, a fourth factor indicating how much data are waiting in a queue to be transmitted, a fifth factor indicating a relative position of the data to be compressed with respect to other data in the queue that are waiting to be transmitted, a sixth factor indicating whether the type of the data to be compressed is suitable for data compression, a seventh factor indicating whether previous compression gain exceeds a second threshold level, and an eighth factor indicating a relative computational power of the mobile unit to be used for data compression tasks.

32. The mobile unit of claim 31 wherein the logic to determine comprises:
- logic to detect a broadcast message transmitted by the particular access point that informs one or more mobile units within the network of the access point's compression capabilities.

33. The mobile unit of claim 31 wherein the logic to determine comprises:
- logic to identify a test data frame from a particular access point with which the mobile unit is associated, the test data frame being used to inform the mobile unit of the access point's compression capabilities.

34. The mobile unit of claim 31 wherein the logic to optionally transmit data in compressed format comprises:
- logic to decide whether to compress one or more particular data frames prior to transmitting the one or more particular frames to a particular access point; and
- logic to compress the one or more particular data frames upon deciding that the one or more particular data frames should be compressed.

35. The mobile unit of claim 31 wherein the logic to decide whether to compress including:
- logic to determine whether a compression threshold is met based upon one or more factors being indicative of whether the one or more particular data frames to be transmitted should be compressed prior to transmission.

36. A machine-readable medium comprising instructions which, when executed by a machine, cause the machine to perform operations comprising:
- informing one or more mobile units within a wireless network that a first access point is capable of handling data compression;
- informing the first access point that a first mobile unit is capable of handling compression;
- optionally compressing data at the first mobile unit prior to transmitting the data to the first access point, comprises:
  - the first mobile unit deciding whether to compress the data based upon at least one factor selected from the group consisting of a first factor indicating whether the first access point is capable of handling data compression, a second factor indicating whether the first mobile unit can perform data compression according to one or more specific compression schemes that are supported by the first access point, a third factor indicating whether the size of data to be transmitted exceeds a first threshold level, a fourth factor indicating how much data are waiting in a queue to be transmitted, a fifth factor indicating a relative position of the data to be compressed with respect to other data in the queue that are waiting to be transmitted, and a sixth factor indicating whether the type of the data to be compressed is suitable for data compression, a seventh factor indicating whether previous compression gain exceeds a second threshold level, and an eighth factor indicating a relative computational power of the first mobile unit to be used for data compression tasks; and
- optionally compressing data at the first access point prior to transmitting the data to the first mobile unit.

37. A machine-readable medium comprising instructions which, when executed by a machine, cause the machine to perform operations comprising:
- informing one or more mobile units within a wireless network that a first access point is capable of handling data compression;
- informing the first access point that a first mobile unit is capable of handling compression;
- optionally compressing data at the first mobile unit prior to transmitting the data to the first access point; and
- optionally compressing data at the first access point prior to transmitting the data to the first mobile unit, comprises the first access point deciding whether to compress the data based upon at least one factor selected from the group consisting of a first factor indicating whether the first mobile unit is capable of handling data compression, a second factor indicating whether the first access point can perform data compression according to one or more specific compression schemes that are supported by the first mobile unit, a third factor indicating whether the size of data to be transmitted exceeds a first threshold level, a fourth factor indicating how much data are waiting in a queue to be transmitted, a fifth factor indicating a relative position of the data to be compressed with respect to other data in the queue that are waiting to be transmitted, and a sixth factor indicating whether the type of the data to be compressed is suitable for data compression, a seventh factor indicating whether previous compression gain exceeds a second threshold level, and an eighth factor indicating a relative computational power of the first access point to be used for data compression tasks.

* * * * *